(12) United States Patent
Van Cor

(10) Patent No.: US 8,858,144 B2
(45) Date of Patent: Oct. 14, 2014

(54) THREADED FASTENER AND FASTENER SYSTEM

(76) Inventor: Dale E. Van Cor, Winchester, NH (US)

( * ) Notice: Subject to any disclaimer, the term of this patent is extended or adjusted under 35 U.S.C. 154(b) by 724 days.

(21) Appl. No.: 12/074,867

(22) Filed: Mar. 6, 2008

(65) Prior Publication Data

US 2008/0219800 A1    Sep. 11, 2008

Related U.S. Application Data

(60) Provisional application No. 60/905,200, filed on Mar. 6, 2007.

(51) Int. Cl.
*F16B 39/30* (2006.01)
*F16B 33/02* (2006.01)
*F16L 15/00* (2006.01)
*F16L 15/08* (2006.01)
*F16B 11/00* (2006.01)
*F16B 39/02* (2006.01)

(52) U.S. Cl.
CPC .................. *F16B 33/02* (2013.01); *F16B 39/30* (2013.01); *F16B 11/006* (2013.01); *F16B 39/02* (2013.01); *F16L 15/005* (2013.01); *F16L 15/08* (2013.01)
USPC ......... 411/366.1; 411/426; 411/416; 411/310

(58) Field of Classification Search
USPC ........... 411/366.1, 366.3, 308–311, 411, 416, 411/426
See application file for complete search history.

(56) References Cited

U.S. PATENT DOCUMENTS

| 2,079,692 | A | * | 5/1937 | Lapointe | 403/334 |
| 3,180,202 | A | * | 4/1965 | Kahn | 411/386 |
| 3,200,691 | A | * | 8/1965 | Neuschotz | 411/422 |
| 3,209,383 | A | * | 10/1965 | Carlson | 470/204 |
| 3,213,742 | A | * | 10/1965 | Kahn | 411/416 |
| 3,377,906 | A | * | 4/1968 | Phipard, Jr. | 411/423 |
| 3,479,921 | A | * | 11/1969 | Omoto | 411/416 |
| 4,069,730 | A | * | 1/1978 | Gutshall | 411/386 |
| 4,430,036 | A | * | 2/1984 | Chapman | 411/416 |
| 4,818,167 | A | * | 4/1989 | Hatsutori | 411/386 |
| 6,899,500 | B2 | * | 5/2005 | LeVey et al. | 411/411 |

* cited by examiner

*Primary Examiner* — Flemming Saether
(74) *Attorney, Agent, or Firm* — Michael J. Persson; Lawson, Persson & Weldon-Francke PC

(57) ABSTRACT

A wave threaded fastener and system. A wave thread extends from the outer surface of the body and is made up of a profile wave and a lateral wave. The profile wave includes a plurality of profile crests and profile roots defining a plurality of profile thread widths. The lateral wave includes at least one lateral crest and at least one lateral root defining at least one wave period. Each wave period forms a period arc having a period arc angle and the sum of all period arc angles about the lateral wave equals three hundred and sixty degrees. Each of the profile crests and roots are aligned with corresponding lateral crests and roots and the wave thread travels one profile thread width per each period arc traveled.

10 Claims, 15 Drawing Sheets

THREADED FASTENER AND FASTENER SYSTEM

CLAIM OF PRIORITY

This application claims the benefit of priority of U.S. Provisional Application Ser. No. 60/905,200, filed on Mar. 6, 2007.

FIELD OF THE INVENTION

The present invention relates to the field of fasteners and seals, in particular, to threaded fasteners and fastener systems that may be quickly and precisely engaged.

BACKGROUND OF THE INVENTION

Threaded fasteners, such as bolts and screws, have been used in a variety of application for many years. Conventional bolts include a thread that is a continuous helical ridge formed on the outside of a cylindrical body. The topmost point on this ridge is called the crest. Between each crest is a space and the bottommost point in this space is called the root. In common bolts, threads are set at an angle to the axis of the bolt, which is called the helix angle. The angle must be sloped, either upward to the right for right-hand threaded screws or upward to the left for left-hand threaded screws. Thread pitch is the distance from the crest of one thread to another crest measured along the length of the thread. The lead distance is the width across the crests of a single or multiple threads.

Conventional threads are designated or named by the external thread major diameter and a pitch measurement. The major diameter is the outer diameter at the top of the thread crests. Thread sizes are given in nominal sizes, not in the actual measurement, and the exact measurement is slightly below the named or nominal size.

Threads are sometimes identified as "fine" or "coarse". A fine thread will have a relatively small pitch measurement, and the threads will be closer together. A coarse thread has a relatively larger pitch measurement, and the threads will be further apart. A fine thread will have less depth as compared to a coarse thread, and consequently are easier to strip. A coarse thread is more resistant to stripping but also less efficient in transmitting torque into thread tension. Generally, a fine pitch is easier to tighten in that tension is achieved at lower torques.

Conventional threaded fasteners are widely used and are generally effective. However, conventional threaded fasteners have a number of drawbacks that make them inappropriate in certain applications. For threads to interchange and match, both the diameter and pitch must match. Even when threads are properly sized, there will be play or slop between external and internal threads when engaged. This play is thought to be normal and is supposed to disappear when the fastener is tightened, allowing a thread to be a bit larger or smaller than ideal while allowing the bolt to still function adequately. However, if tolerances are exceeded, the fastener may require excessive force to install, causing the thread to fail during tightening, or may result in a sloppy fit, compromising the holding power of the fastener.

Tightened threads subjected to vibration loosen because of the clearance space. This clearance is needed to engage the threads, such as in a nut and bolt, with a reasonable amount of friction. Its drawback is that it becomes the ramp that the screw or nut will follow and loosen subject to thermal changes and/or vibration.

Further, because of the unreliable fit of conventional threaded fasteners, and their substantially constant diameter, sealing compounds or gaskets are needed when such fasteners are used in connection with packaged foods or in pressurized applications, such as plumbing, in order to ensure that fluids do not migrate through gaps in the threads and cause leaks. The use of such compounds or gaskets significantly adds to the cost of these applications. Further, even if compounds or gaskets are applied, it is not readily apparent whether such compounds or gaskets are providing an adequate seal.

Another, disadvantage of conventional threaded fasteners is that it is difficult to determine their depth, which allows them to be over tightened to extend beyond their intended length. This disadvantage is of greatest detriment in the case of screws, where screw tips can extend beyond the backside of the material to be joined, but is likewise an issue with conventional bolts.

Still another disadvantage of conventional threaded fasteners is the need to properly center the fastener within the hole. Improper centering can result in stripping of the threads and, therefore, care must be taken to ensure that the threads are properly centered to mate with the opening.

Finally, because conventional threaded fasteners require a large number of threads to be engaged in order to provide adequate holding power, and because these threads are of a substantially fixed major diameter, conventional threads must be rotated a large number of times in order to adequately secure them. Accordingly, high-speed assembly of conventional threaded fasteners requires the use of an automated screw gun, or variable speed drill equipped with a driver bit. These devices are cumbersome, expensive, and pose a high risk of stripping the head of the bolt or screw.

In response to these problems, the inventor of the present invention developed the conic threaded fastener disclosed in co-pending patent application Ser. No. 11/178,890, filed on Jul. 11, 2005, which is incorporated herein by reference in its entirety. However, it has been found that the conic threaded fastener presents certain manufacturing challenges that have heretofore prevented it from gaining widespread acceptance. Accordingly, there is a need for a fastening system that has the advantages of the conic threaded fastener, but is substantially easier to manufacture.

Therefore, there is a need for a threaded fastener that produces a tight seal without the use of gaskets or sealants, does not have a clearance space, that is of fixed length and cannot extend beyond its intended design length, that may be tightened, either automatically or by hand, more quickly and easily than conventional fasteners, that is self-centering and therefore fast to setup, that eliminates the need for a screw gun, that distributes pressure on the threads over a larger surface area of the teeth than a cylinder shape, that may be quickly tightened, and that is substantially easier to manufacture than the inventor's conic threaded fastener.

SUMMARY OF THE INVENTION

The present invention is a wave threaded fastener and a wave threaded fastening system that includes the wave threaded fastener and a workpiece. The wave thread that forms the basis for the fastener and fastening system was developed through work on the inventors conic thread invention.

In its most basic form, the wave threaded fastener includes body having a central axis, an outer surface, a top end, and a bottom end. A line intersecting each of the plurality of profile roots defines the outer surface of the body. The outer surface forms a circumference about the central axis and this circumference progressively decreases from the top end to the bottom end. A wave thread extends from the outer surface of the body and is made up of a profile wave and a lateral wave.

The profile wave corresponds to the wave that is seen on the outside edges of the fastener when the fastener is sliced from top to bottom along its central axis. The profile wave is a continuous wave extending from the top end of the body to the bottom end of the body and includes a plurality of profile crests and profile roots defining a plurality of profile thread widths.

The lateral wave corresponds to the closed loop wave that is seen about the outside edges of the fastener when it is sliced along a plane intersecting the central axis of the body and each lateral crest of the wave threaded fastener. The lateral wave includes at least one lateral crest and at least one lateral root defining at least one wave period. Each wave period forms a period arc about the central axis of the body and each period arc has a period arc angle. The sum of all period arc angles about the lateral wave equals three hundred and sixty degrees.

Finally, each of the profile crests is substantially aligned with a corresponding lateral crest and each of the profile roots is substantially aligned with a corresponding lateral root such that the wave thread travels one profile thread width per each period arc traveled.

In some embodiments, the wave thread is a surface wave thread in which the profile crests and profile roots of the profile wave are each disposed in substantially perpendicular relation to the outer surface of the body. In other embodiments, the wave thread is an axial wave thread in which the profile crests and profile roots of the profile wave are each disposed in substantially perpendicular relation to the central axis of the body.

The threaded fastener may include wave threads having any number of leads. In a preferred embodiment the wave thread is a single lead wave thread in which the lateral wave consists of one lateral crest and one lateral root defining one wave period. In other embodiments, the wave thread is a multiple lead wave thread in which the lateral wave consists of multiple lateral crests and multiple lateral roots, each defining one wave period. In some embodiments, all wave periods are the same and the lateral wave is substantially symmetrical. In other embodiments, at least one wave period is substantially different from at least one other wave period, which results in an asymmetrical lateral wave.

The outer surface of the body may take many forms, provided its circumference decreases progressively from the top end to the bottom end. In some embodiments, the outer surface is concave. In others, the outer surface is convex. In others, the outer surface is conic. In still others, the outer surface has a profile that varies from one portion to another. For example, some embodiments combine a conic portion and a concave portion, while other combine concave and convex portions.

In its most basic form, the wave threaded fastening system includes the wave threaded fastener described above and a workpiece that includes at least one inner surface having at least one inner wave thread dimensioned to engage with the outer wave thread of the wave threaded fastener.

In the preferred embodiment of the system, the outer wave thread and the inner wave thread are dimensioned such that at least fifty percent of a surface of the outer wave thread is in contact with a surface of the inner wave thread when the outer wave thread is fully engaged with the inner wave thread. In some such embodiments the wave threaded fastener is a cover and the workpiece is a container, such as a soft drink container or jar. In these embodiments, the engagement of the cover and the container results in a substantially fluid tight seal.

Although the high percentage of surface contact between the outer and inner threads creates sufficient friction to prevent most unwanted rotation, in some embodiments, the system also includes a separate locking means for preventing unwanted rotation of the threaded fastener relative to the workpiece. In some embodiments, the locking means is a breakaway ring, which may be used once. In others, it is a spring clip or a set of ratcheting teeth that may be reused each time the system is unthreaded and rethreaded. In still others, the locking means forms a permanent seal, such as a welded or adhesive joint. It is noted that the welded joint or adhesive joint need not surround the circumference of the fastener and, rather, this joint is preferably a spot joint or series of spot joints that are intended merely to resist rotation of the fastener relative to the workpiece.

In some embodiments of the system, the fastener and workpiece form a fluid valve. In some such embodiments, the workpiece is a valve body that includes a wave thread seat and the wave threaded fastener is a wave plunger. In other such embodiments, the wave threaded fastener is the valve body and the workpiece is a wave plunger Other embodiments of the wave threaded fastening system form connectors. In such embodiments, the threaded fastener is a male portion of a connector, the workpiece is a female portion of the connector and the male portion of the connector and the female portion of the connector are each dimensioned such that full engagement of the outer wave thread and the inner wave thread results in a connection being made. In some embodiments, the connector is an electrical connector and the male and female portions of the connector each include electrically conductive leads that come into contact with one another when the connector is engaged. In other embodiments, the connector is a fiber optic connector in which engagement of the two portions results in a connection between fiber optic cables that allows light waves to pass therethrough. In still other embodiments, the connector is a fluid connector in which engagement of the two portions results in a connection between fluid conduits, such as water or gas lines, that allows the fluid to pass therethrough In some embodiments, at least one of the outer wave thread and the inner wave thread is manufactured from more than one material. These embodiments are especially useful when the system is used as an electrical connector, as it allows the threads to include both conductors and insulators. Similarly, these embodiments are useful in embodiments in which multiple material, such as rubber or plastic, are joined together.

Finally, in some embodiments, each of the wave threaded fastener and the workpiece includes at least two concentric wave threads. In such embodiments, each of the wave threads of the wave threaded fastener engage with the corresponding wave threads of the workpiece at an equal rate of insertion per rotation; i.e. rotating the outside of the fastener equally joins both wave threads of the fastener to the corresponding wave threads on the workpiece.

The physics of the wave thread allows greater surface contact than with conventional threads. The reason for this greater surface contact is that conventional threads have to be designed with clearance so the male and female can be screwed on with an allowable amount of friction. The shape of the wave thread means that the external thread can be inserted well into the internal thread before the threads start to engage. As the wave thread is screwed on, the external thread moves down and outward towards the internal thread at the same time. When the thread is screwed tightly, it is in compression between the internal and external sides. It also may be screwed tightly with fewer rotations than with conventional threads.

The wave threaded fastener may be shaped as a cone, or may have a concave or convex shape or a combination. The cone shape has straight sides and the concave or convex are curved. The concave is a bowl or dome shape. The engagement of threads starts on the larger outside diameter and move inward. The convex is a vortex or whirlpool shaped. Its threads start engagement on the inside diameter and move outwards. These different shapes have different properties. Their combination is a function of matching threads and matching rate of engagement such as inches/revolution.

The wave thread is similar to the conic thread in that it can also be in a cone, concave or convex surface. The conic thread also fully engages its surfaces to form a seal and maximizes its coefficient of friction to make a strong seal.

The differences are the conic thread is a profile that is kept perpendicular to its thread angle, which requires at least 5-axis CNC machining to achieve its profile. The wave thread is always the shape of a wave, not necessarily a sine wave, which is made up of a profile wave and a lateral wave. Conversely, the conic thread has a large range of shapes such as square, conventional V-shaped or sine wave. It can morph from one shape to another.

The wave threads can have different size waves. The lateral wave period circles can have varying period lengths and amplitudes that will produce unequal thread leads, but they will always have a wave shape.

There are actually two types of waves: an axial wave thread whose wave origination is based on the axis of rotation projected to the surface; and a surface wave thread that originates on the surface of the thread. The surface wave can be a true sine wave and the axial wave is always skewed and never a true sine wave.

The wave threads are also easier to make then the conic threads. A surface wave thread needs requires at least a 4-axis controlled CNC milling machine. The axial wave thread needs a 3-axis controlled CNC machine. The axial wave is the easiest to make and special jigs can reduce to hand power tools.

The wave thread of the wave threaded fastener of the present invention is ideally suited to a number of applications. In food and pharmaceutical packaging applications, many wave threads ensure a strong hold. The wave thread is designed to fully engage many threads with a half a turn and is tight only at the beginning or end. Conversely, a typical screw thread is designed to be loose enough to tighten by hand, but not create a seal. Therefore, the use of a fastener with wave thread makes it possible to eliminate gaskets from conventional food jars, medicine bottles, glue bottles or other dry or wet products that need to be kept as such.

Because wave threads make contact with the flanks of the mating threads, the wave thread forms an inherently tighter seal. In piping for liquids or gases, this allows connections to be made without sealants or compression fittings, as the threads themselves become a dynamic part of making the seal. In plumbing, the threads provide the locking mechanism for holding the sealing members in place. Plumbing pipe threads have a coating applied to the threads before engaging that provides the sealant once tightened. Compression fittings in plumbing and gas lines compress a collar against a nipple or cone to form the seal. The compression force is held by the threads and is not part of the seal. The wave thread provides a simpler solution with fewer dynamic components.

The physics of the wave shape distributes force exerted on the threads. Shearing forces accumulate on edges and corners. Waves do not have edges. This applies to blunt trauma against the threads or a shearing force. The cone, concave and convex shapes the threads follow also serve to distribute shearing energy. The conic, convex, and concave wave thread mate relative to the local area of clearance. The engagement process of the teeth is in two directions. As the threads are screwed together, the threads move downwards and outwards. This allows room for the size to change. A convex thread can have its teeth change from largest to smallest as the thread diameter is reduced. The concave thread is opposite; its teeth can become larger as its thread diameter decreases. The threaded component can have a combination of threads such as a single lead, double lead and triple lead. There has to be enough room for the single lead portion to pass through the double lead portion without interfering. These two separate threads systems will be at a different diameter and thus have local clearance. They also have to engage at the same rate.

Standard threads engage through a cylinder and require clearance to reduce the amount of friction. These threads typically have 30-35% surface contact. The wave threads on a conic, convex or concave surface can have near perfect surface contact because they do not require the same clearance. Their engagement is from two directions, down and outwards. When the thread has reached its maximum depth, it is at its maximum outward extension as well. This type of surface contact has two inherent qualities: it maximizes the material's coefficient of friction and it creates a seal. The friction means that it will be easier to engage, but much harder to disengage. The sealing characteristic will apply even with 50% or less of surface contact, though a larger percentage is preferred. This is because creating a seal is not as much as a function of 100% surface engagement, but of resisting leak path.

The high surface contact of the Wave threads lends itself to making multi-point contact applications such as electrical power or electrical communications; laser, hydraulics or pneumatics lines. These multiple lines, fibers or tubes are connected using the high surface contact of the wave thread. As electrical lines, a small surface area of one line on an internal wave thread can engage the corresponding area on the external thread as the threads cone into full contact. This would also apply to a hydraulic line that is an opening on an internal thread. When its corresponding opening on the external thread is locked then it becomes a line. The materials surrounding the holes create the seal between these lines. One method for creating such lines is by making layers that have electrical contacts that are laminated together to form the internal or external threads.

In many industries, the attachment of fasteners must be automated in order to ensure precision in their tightening. The wave screw or nut and bolt have exact lengths and cannot be over tightened. It is on at torque pressure once. In many assembly operations, people with screw guns insert bolts. The wave screw is self-centering making it quicker with less eye hand coordination to install and with fewer rotations will make this inherently quicker.

Other applications would benefit from the ability to create a strong seal quickly. These include the doors of vacuum or explosive chambers and the breeches of guns. The use of fasteners with wave threads in vacuum or explosive chambers uses the sealing characteristics of the wave thread with its inherent securing characteristics to create a fastener designed to engage the maximum amount of surfaces. In artillery, the breech loading entry is a locking mechanism that is half thread and half clearance gap. The threaded portion is fitted in the clearance gap until closed, then rotated less then a half turn so the threads can fully engage providing the lock.

Still another application that would benefit greatly from the use of a wave threaded fastener is the manufacture of valves. A Wave threaded valve with a wave-threaded plunger and seat would have thread cavities as the flow channel through the valve. When the threads are tighten, the cavity disappears and the channel is closed. These threads can be multiple and a steep angle. If the thread angle is steep enough, then a separate screw would control the plunging and it would look and act similar to a plug valve. Further, as the closing of the channel is gradual, the use of a threaded valve allows for precise control of the amount of flow through.

Another benefit of the wave threaded valve is its noise reduction and enhanced mixing properties. As a wave threaded valve does not allow flow in a straight line, it turns the media passing through creating a spinning vortex, which is quieter and mixes better then a straight valve. The wave threaded valve spinning discharge is around its perimeter and discharges inwardly if the flow is in the direction of the small end of the valve. If the flow is from small to large end of the valve, then the large end is designed to direct the flow inwards to achieve the same spinning vortex.

Still another benefit of the wave threaded valve is its extended service life and reduced maintenance. In wave threaded valves, the wearing of the wave threads is uniform enough so the plunger can be turned down more to achieve the same control. This means that the valve can be screwed in more to compensate for wear, keeping this valve operational and reducing the frequency of required maintenance.

Wave threads on concave and convex shapes can be applied in all the applications of the wave thread on a cone, and is especially useful in connection with threaded fasteners and valves. The valve application takes advantage of the two directions of engagement that creates a space between the mating threads. The wave thread can have a uniform change in volume. That means that as it is twisted, the change in volume is equal across the length of the thread. The concave and convex wave threads are difficult to make uniform. It lends itself to a constant increase or constant decrease in its change in volume. The benefit of this is that an expanding gas going through the valve will have a space to expand into as its pressure drops, which will organize the flow and reduce both turbulence and noise. A fluid will increase in speed as it is forced through a smaller volume. The speed changing characteristics will create unequal wearing characteristics with more wear on the end that has the highest speed. This will allow the valve seating to be designed for this high-wear portion such as 25% on the fastest side while the other 75% will have less wear and thus, seat properly for an extended period. When the valve is closing, the dynamics of how the increasing volume changes with the convex or concave wave thread will squeeze out the gas or fluid medium more efficiently then the constant changing wave thread and in a particular direction. The convex wave threads will squeeze outwards to the larger diameter and the concave wave threads will squeeze inwards towards the smaller diameter. Finally, as changing volumes and pressures also result in changes in temperature when used in connection with gases, some embodiments of the valve have heating or cooling elements added.

Wave threads are readily adapted for use in connection with soft drink bottles. Because of the sealing characteristics of each type of thread, the use of wave threads allows the soft plastic inserts in plastic bottle caps to be eliminated. This saves the cost of the plastic material, the manufacture of the insert, the insertion of the insert into the cap, and makes the cap more easily recyclable.

Wave threads are also readily adapted for use with bottles, jars and cans. In cans where the tops are soldered on, the concave wave thread would either be on the inside ⅜ inch of the lip or on the outside. This would make the steel can more easily recyclable. Currently the solder and sometimes the top is a different metal. The cans would also be resealable with a screw-on cover and would not need a can opener. The threads have to be barely wide enough to create a seal with 2-4 leads that requires only one quarter turn to one half turn to unscrew. If on the outside, the net diameter does have to exceed the diameter of the can so it can still be used in current handling equipment. This type of thread in the can would be pressed in with rolling dies. The cover can be designed to screw on the inside or outside of the can Wave threads are also readily adapted for use with sealed electrical connections. Electrical connections are the bane of the power and electronic world, as over ninety percent of all problems are with connections. There are many types of electrical and electronic connectors. The strengths of the wave connections are that they are sealed, strong and multiple. There can be multiple leads for many connections. The strength of the connection means that the connecting plugs can be designed to be stronger then their attached cables. The sealing aspects stop outside corrosive gases or fluids from entering. A thread can have longer surface connections then the push plugs, which reduces resistance where the current flows. The connection is made within an inner portion of the wave thread while the outside portion creates the seal. This would incorporate a thread with two types of materials such as plastic on top outer portion and metal strips on the inner portion. One way this is accomplished by layering the materials and then cutting the wave threads out. These layers would be flat. Another is making the layers with the portions of wave. The layers are then glued or fastened together.

Another way to combine different wave characteristics is to have multiple wave systems combined concentrically one inside the other. This would amplify the number of surfaces that can be connected in one operation. The application is in electrical contacts in which the thread is two materials. There can be many threads for communication lines or a two to four for power connections. The seal of power connections can also be made watertight.

Conic, concave and convex wave threads are also readily adapted for use with sealed fiber optic connections. In these applications the thread can make a quick, sealed connection between two adjoining fiber optic lines. A compression fitting would allow the insertion of the female thread into a male end of one line, which could be compressed with only a half twist. Gang connections would be machined made with one thread a different size acting as a key to ensure there is only one way to connect it. This would bring many fibers into precise alignment. A gang connection could seal many electrical phone lines together with a simple twist that cannot be made without aligning the key, preventing bent or broken pins.

The wave thread has been shown with multiple leads. There can be multiple concentric cones inside of one conic unit. The male and female cones mate in the same fashion, just all at once and at the same rate. This is a multiplier of connections. Computers and electronics are heading for more complex connections with more components and other networks.

PVC and other plastic lines can have the conic, concave or convex wave threads made into their ends. This would allow connection without hardware. Just screw them together. If the plastic is clean, it will hold a seal and have strength to resist coming apart. This could expand the utility of PVC piping in agriculture. The strength of this application lies in the ability to disassemble the wave threaded pipe. Flexible hose has problems with properly drying out, which creates mildew and other biological colonization. The pipes have an inherent drying capability when stored because they are held open. The attaching wave threaded components such as elbows (30, 60, 90-degree), valves and unions (male/male and female/female) would be needed if two lines were made in opposite directions. The male union should always be in the direction of flow. The flexibility of PCV pipe can bend for smaller angles.

Rubber hose, soft or reinforced, is held to a coupling with pressure. The compression fitting designed for this application would use the concave or convex properties in which one part of the thread is in a mating thread and the other part is against the hose. This would be three parts: wave mating threads to attach the male/female components; with a threaded nipple that goes inside hose; and a threaded outside male piece. These would be two thread systems: one for adjoining and the other a form to compressing the hose in an undulating manor. The hose thread may be more convex or concave to allow more compression to happen away from the end of the hose. For a concave thread, excess hose would be squeezed forward. This small amount of "bunching" would greatly add to the strength of the connection. The net system would allow for a hose diameter clearance plus its compression index.

Therefore, it is an aspect of the present invention to provide a threaded fastener and fastening system that produces a tight seal without the use of gaskets or sealants.

It is a further aspect of the present invention to be incorporated with other fasteners to provide a protective seal and/or enhanced fastening.

It is a further aspect of the present invention to be incorporated with exiting head designs that make the affixing easy, but detaching difficult thus enhancing the security of the fastener.

It is a further aspect of the present invention to provide a fastener and fastening system that is of fixed length and cannot extend beyond its intended design length.

It is a further aspect of the present invention to provide a fastener and fastening system that may be tightened, either automatically or by hand, more quickly and easily than conventional fasteners.

It is a further aspect of the present invention to provide a fastener and fastening system that is self-centering and, therefore, fast to setup.

It is a further aspect of the present invention to provide a fastener and fastening system that eliminates the need for a screw gun.

It is a further aspect of the present invention to provide a fastener and fastening system that distributes the pressure on the threads over a larger surface area of the teeth than a cylinder shape.

It is a further aspect of this present invention that the single lead thread is a collection of circles; with a wave that can on a conic, convex or concave shape with constant or varying period and/or amplitude; that these circles are a wave expressed on a circle and are offset by the waves amplitude and oriented by the waves crest relative to the axis of the work piece.

It is a further aspect of this present invention that single lead wave thread has the fewest design parameters and is the easiest to machine.

It is a further aspect of the present invention to provide a fastener and fastening system that may be specialized for many designs by varying angles and profile characteristics.

It is a further aspect of the invention to provide a threaded valve utilizing the threaded fastener and fastening system of the present invention.

It is a still further aspect of the invention to provide a threaded valve that reduces noise, provides enhanced mixing characteristics and reduces the frequency of required maintenance.

It is a still further aspect of the invention to provide a threaded valve that is designed to with specific wear characteristics to enhance the useful life of the valve; that allows more rotation of the valve to create a seal as the flow of medium has worn down some of the surfaces; that can allow a faster flow per rotational position indicating extent of ware and thus prediction of continued valve life.

It is a further aspect of the invention to provide a threaded connection such as pipe witch can augment other connection systems such as welding or gluing; whereby the movable wave thread will create the seal and the other connection will enhance the secure, non-movable fastening.

It is a further aspect of the invention to provide a threaded fastener and fastening system with a locking mechanism to further secure the position of the mated internal and external threads.

It is a further aspect of the invention to provide a passive locking mechanism to further secure the position of the mated internal and external threads with teeth or mating shapes molded or fabricated into the pipe or bolt and its mating work piece.

It is a further aspect of the invention to provide a threaded breakaway locks such those used to demonstrate tampering or the compromise of sealing as in beverage, food, medical and hazardous material application.

It is a further aspect of the invention to provide a thread whose materials become a function of the sealing dynamics such that the top of a soda cap may not break its seal because the wave thread has not turned enough; that one end of the wave thread is disengaged while the other end has not, such as in the use of rubber.

It is a further aspect of the invention to have the wave form thread more dynamically and uniformly efficiently disperse energy then conventional thread; that this dispersion can be mechanical vibration, torsional or lateral forces; that this dispersion can be the conductance of heat or cold; that the efficiency is a close percent to the coefficient of conductance of the material for that form of energy.

It is a further aspect of the invention to provide a threaded fastener and fastening system that creates a seal to be used where the environment wares out or compromises current seals; the wave thread can be made of materials more suited to withstanding such an environment including vacuums, high pressure, corrosive chemical, high heat or excessive vibration.

These aspects of the invention are not meant to be exclusive and other features, aspects, and advantages of the present invention will be readily apparent to those of ordinary skill in the art when read in conjunction with the following description, and accompanying drawings.

DETAILED DESCRIPTION OF THE INVENTION

Figure 1:
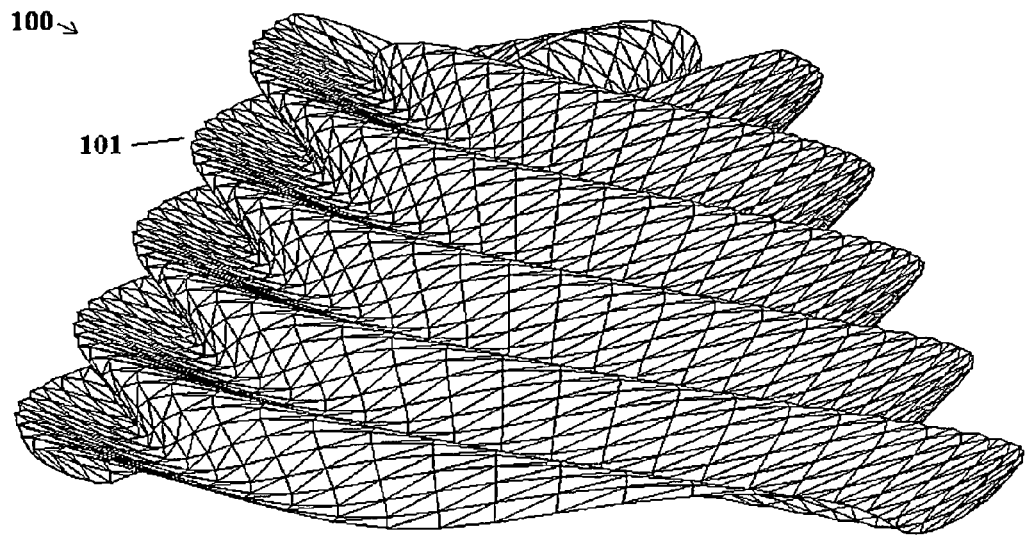
FIG. 1 is a wire frame front isometric view of a symmetrical four lead surface wave threaded fastener.
Figure 2:
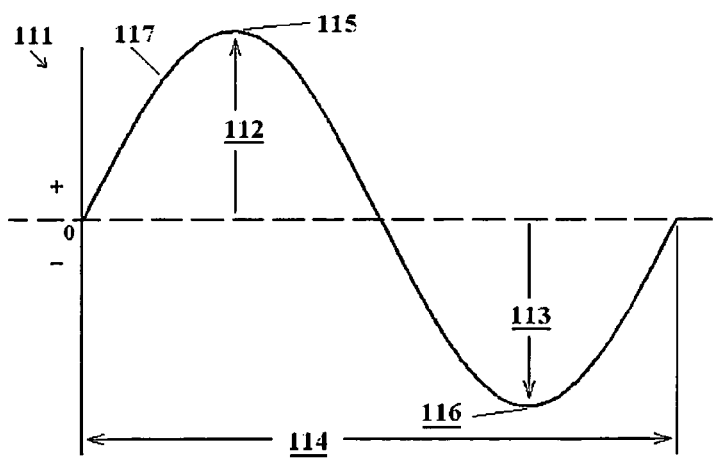
FIG. 2 is a sine wave graph.

There are two types of wave threads that may be formed on a threaded fastener. The first type is referred to as a "surface wave thread" and the second is referred to as an "axial wave thread". A threaded fastener 100 having a surface wave thread is shown FIG. 1 and a threaded fastener 200 having an axial wave thread as shown in FIG. 6. These types of threads have certain key differences. However, as explained in detail below, each adheres to the same basic thread design rules that apply to all wave threads; that the wave thread is made up of a profile wave and a lateral wave, that the crests and roots of the profile wave are substantially aligned with the corresponding crests and roots of the lateral wave, and that the wave thread travels one profile thread width per each period arc traveled The threaded fastener 100 of FIG. 1 is described below with reference to FIGS. 2-5. The basic concept of the wave thread starts with a sine wave graph 110 in FIG. 2. It has a wave 117 on a Cartesian plane 111 with positive 112 and negative 113 amplitudes and a width 114, which is commonly referred to as a wave period. In the field of thread design, the terms "crest" and "root" are terms used in describing a thread's maximum and minimum diameter and the thread width is distance between corresponding points on adjacent threads. In a wave thread the maximum positive amplitude 115 corresponds to the crest and the maximum negative amplitude 116 corresponds to the root and the width 114, or wave period, corresponds to the thread width. It is noted that width 114 is shown in FIG. 2 as the distance between the points where the wave crosses the base line on the Cartesian plane 11 for the sake of simplicity and clarity and that the width 114 refers to the distance between any two corresponding points on the wave, including the distance between adjacent crests or roots. Further, although FIG. 2 is shows a sine wave graph 110, the wave need not be a sine wave and the wave thread may follow any continuous wave.

Figure 3:
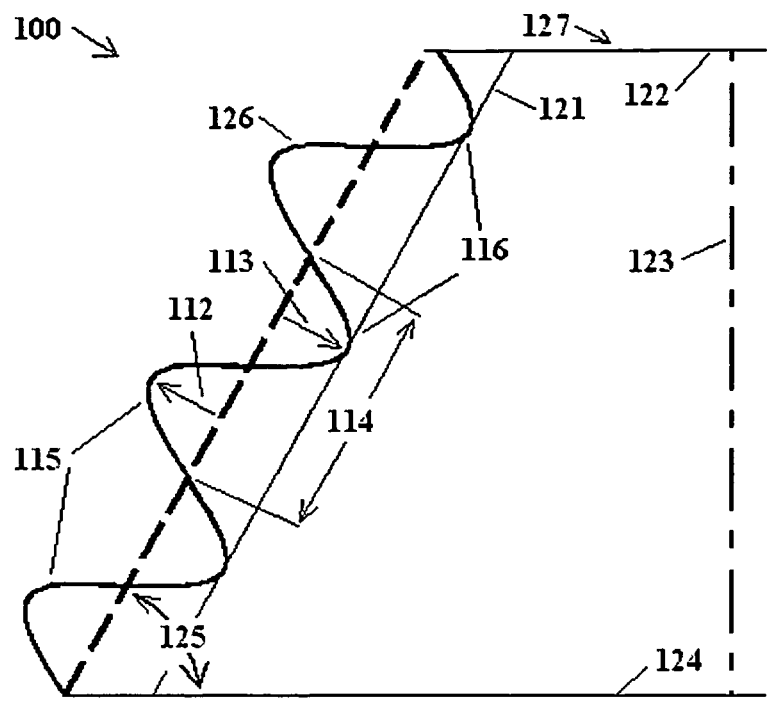
FIG. 3 is a diagrammatic view showing a portion of a profile wave of the surface wave threaded fastener of FIG. 1.

A profile wave 126 is one of two waves that form the wave thread, and this profile wave 126 is represented in FIG. 3 by the transposition of the sine wave 117 of FIG. 2 onto the outside surface of a threaded fastener 127.

As shown in FIG. 3, the wave threaded fastener 100 includes a body 127 having a central axis 123, an outer surface 121 defined by a line intersecting each root 116 of the profile wave 126, a top end 124 and a bottom end 122. The outer surface 121 forms a circumference about the central axis 123 and this circumference progressively decreases from the top end 124 to the bottom end 122. It is noted that the outer surface 121 of the body 127 of the fastener 100 of FIG. 3 is disposed at a substantially constant angle 125 and, accordingly, this portion of the fastener 100 is conic. However, the outer surface 121 of the body 127 may take many forms, such as concave, convex or combinations thereof, provided its circumference decreases progressively from the top end 124 to the bottom end 122. It is also noted that, although the top end 124 is shown at the bottom of FIG. 3, the term "top end 124" when used herein will always refer to the end of the threaded fastener 100 having the largest circumference.

The profile wave 126 corresponds to the wave that is seen on the outside edges of the fastener 100 when the fastener 100 is sliced from its top end 124 to its bottom end 124 along its central axis 123. The profile wave 126 is a continuous wave extending from the top end 124 of the body 127 to the bottom end 127 of the body 127 and includes a plurality of profile crests 115 and profile roots 116 defining a plurality of profile thread widths 114. Relating this profile wave 126 back to the sine wave of FIG. 2, the positive amplitude 112 and negative amplitude 113 create the crest 115 and root 116, and the width 114 represents the thread width 114. It is noted that, although the profile wave 126 is shown as a sine wave having uniform amplitudes 112, 113 and thread widths 114, the profile wave 126 need not be uniform and other embodiments have profile waves in which thread widths and amplitudes vary.

The profile wave 126 of the threaded fastener 100 shown in FIG. 3 has profile crests 115 and profile roots 116 that are each disposed in substantially perpendicular relation to the outer surface 121 of the body 127. Accordingly, FIG. 3 shows a surface wave threaded fastener 100. In practical terms this means that the each of the crests 115 is disposed at angle 125 from a plane defined by top end 124 of the fastener 100. As described below with reference to FIG. 7, this profile wave 126 differs from the profile wave 214 of an axial wave threaded fastener 210, in which in which the profile crests 224 and profile roots 225 are each disposed in substantially perpendicular relation to the central axis 211 of the body of the fastener 210 and the crests are substantially parallel to the plane defined by the top end 22 of the fastener 210.

Figure 4:
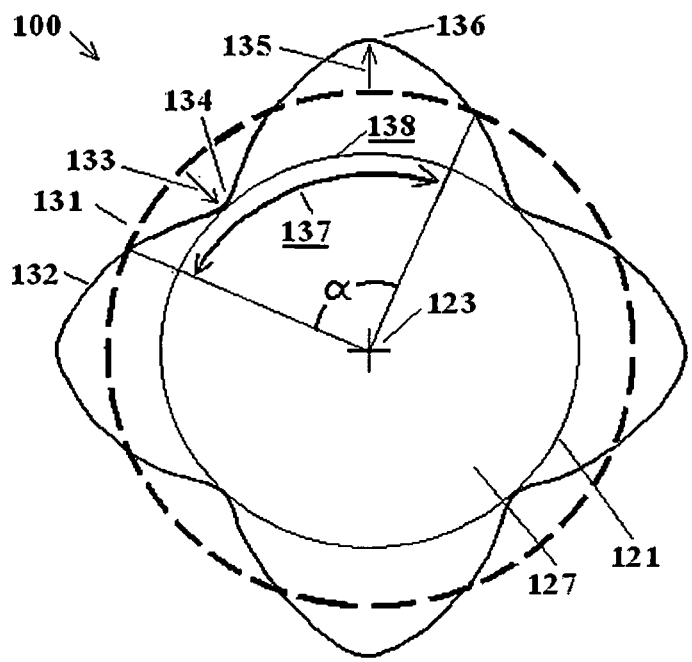
FIG. 4 is a diagrammatic view showing one lateral wave of the surface wave threaded fastener of FIG. 1 from the cross section of a later wave thread.

The lateral wave 132 is the second of two waves that form the wave thread of the wave threaded fastener 100. As shown in FIG. 4, the lateral wave 132 corresponds to the closed loop wave that is seen about the outside edges of the fastener 132 when it is sliced along a plane intersecting the central axis 123 of the body and each lateral crest 136 of the wave threaded fastener 100. The lateral wave 132 includes at least one lateral crest 136 and at least one lateral root 134 defining at least one wave period 138. The dashed line in FIG. 4 represents the period circle 131 from which the amplitude 135 of each crest 136 and the amplitude 133 of each root 134 is measured. Because the lateral wave 132 is disposed relative to the period circle 131, the width between corresponding points on the lateral wave 132 is measured along an arc and is referred to as a wave period 138. Each wave period 138 forms a period arc 137 about the central axis 123 of the body and each period arc 137 has a period arc angle α. The sum of all period arc angles α about the lateral wave 132 equals three hundred and sixty degrees.

Figure 5:
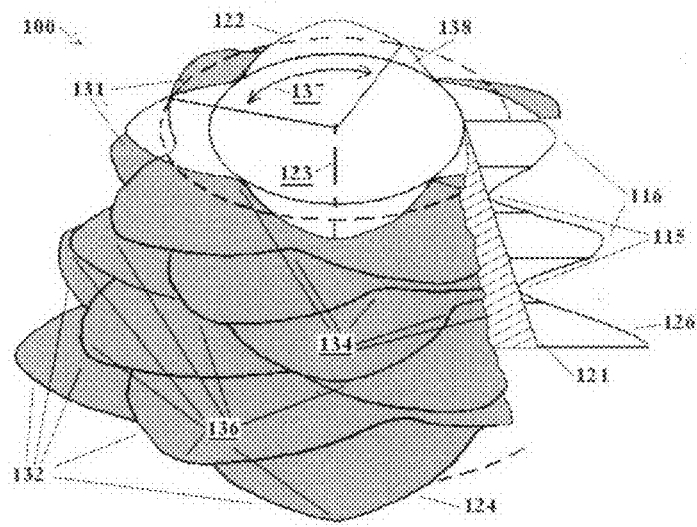
FIG. 5 is an isometric view of a stack of lateral wave threads forming the fastener of FIG. 1, in which a portion is cut away to show the relationship between the lateral wave and the profile wave of FIG. 3.
Figure 6:
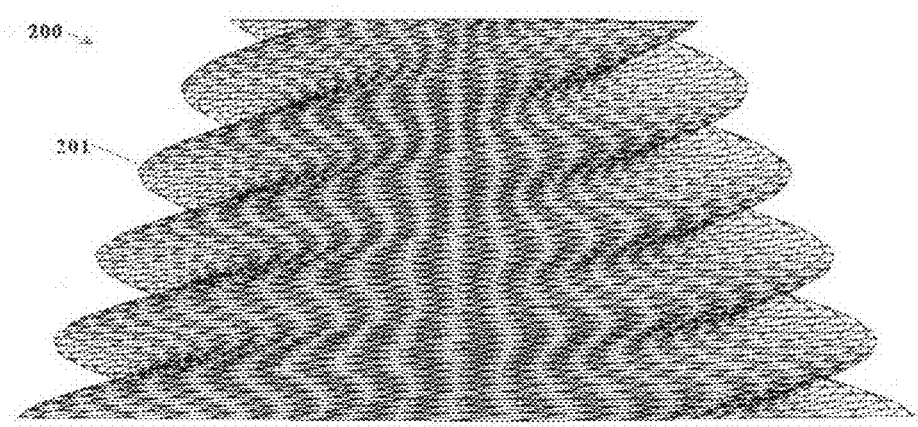
FIG. 6 is a wire frame front isometric view of a single lead axial wave threaded fastener.

As shown in FIG. 5, the lateral waves 132 are essentially slices of the wave-threaded fastener 100 in a plane intersecting the axis 123. The lateral wave 132 has the same axis 123 as the profile wave 126 and each successive lateral wave 132 becomes larger and is rotated relative to the adjacent lateral wave 132. The direction of the rotation deter-mines the handedness of the fastener 100; in this case it is a left handed thread.

It is noted FIGS. 4 and 5 show a symmetrical four lead wave threaded fastener 100 that has a lateral wave 132 made up of four equal period arcs 137, each having a period arc angle α of ninety degrees. However, the lateral wave 132 need not be symmetrical and each period arc angle α may be different from other period arc angles α provided the sum of all period arc angles α equals three hundred and sixty degrees. Further, the amplitudes of each crest 136 and root 134 may vary from one period arc 137 to the next period arc 137. Finally, as described in detail below, the lateral wave 132 may have one, two, three or more wave periods 138, with the number of wave periods 138 corresponding to the number of leads of the wave threaded fastener 100.

The profile wave 126 and the lateral wave 132 are directly related to one another and this relationship is one of the aspects of the invention that is unique from all other fasteners. In particular, each of the profile crests 116 of each profile wave 126 is substantially aligned with a corresponding lateral crest 136 of a lateral wave 132, and each of the profile roots 116 of the profile wave 126 is substantially aligned with a corresponding lateral root 134 of the lateral wave 132. The result of this relationship is that the wave thread 101 travels one profile thread width 114 per each period arc 137 traveled. Put another way, when the wave threaded fastener 100 is engaged with a mating workpiece (not shown), rotating the fastener 100 by an angle equal to one period arc angle α will result in the fastener moving vertically to the same relative position on an adjacent thread.

Figure 7:
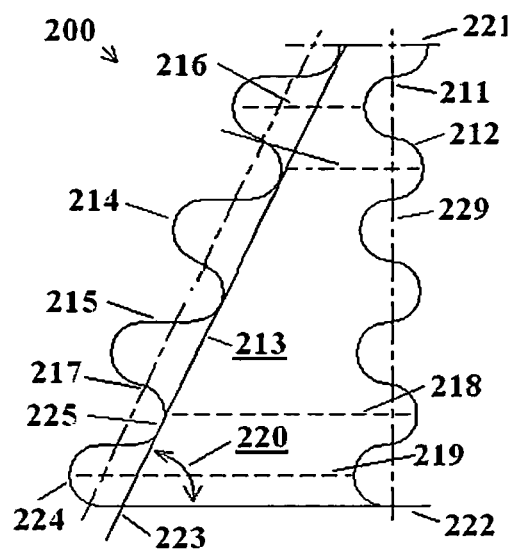
FIG. 7 is a diagrammatic view showing a portion of a profile wave of the axial wave threaded fastener of FIG. 6.

FIGS. 6-9 describe a single lead wave threaded fastener 200 having an axial wave thread 201. The axial wave 210 diagramed in FIG. 7 is based on a reference wave 212 generated on its central axis 211 and projected horizontally to the outer surface 223 of the body 213 of the fastener 200. As the dashed lines 218, 219 show, the crests on reference wave 212 directly correspond to the crests 224 on the profile wave 214 and the roots of the reference wave 212 directly correspond to the roots 225 on the profile wave 214. The practical result of this projection is an elongation of the portions 215 of the wave between the crests 224 and the roots 225 closest to the bottom end 221 of the body and a shortening of the portions 217 of the wave between the crests 224 and the roots 225 closest to the top end 222 of the body 213.

The axial wave threaded fastener is simpler then the surface wave threaded fastener and it has a unique property: a single lead axial wave thread is essentially a stack of disks. This property is described with reference to FIGS. 8 and 9.

Figure 8:
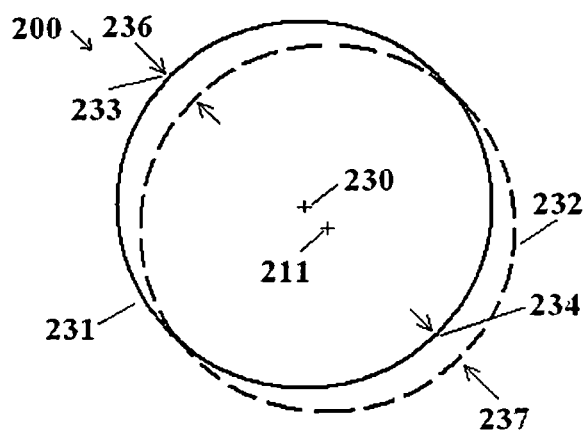
FIG. 8 is a diagrammatic view showing one lateral wave of the axial wave threaded fastener of FIG. 6.

FIG. 8 shows a lateral wave 23.1 for the single lead axial wave threaded fastener 200. The period circle 232 is dashed circle and the lateral wave 231 is the solid circle. The positive amplitude 236 represents crest 233 and the negative amplitude 237 represents the root 233. The positive and negative amplitudes 236, 237 in this case are equal and represent the distance between the central axis and the counterpoint 230 of the circular lateral wave 231.

Figure 9:
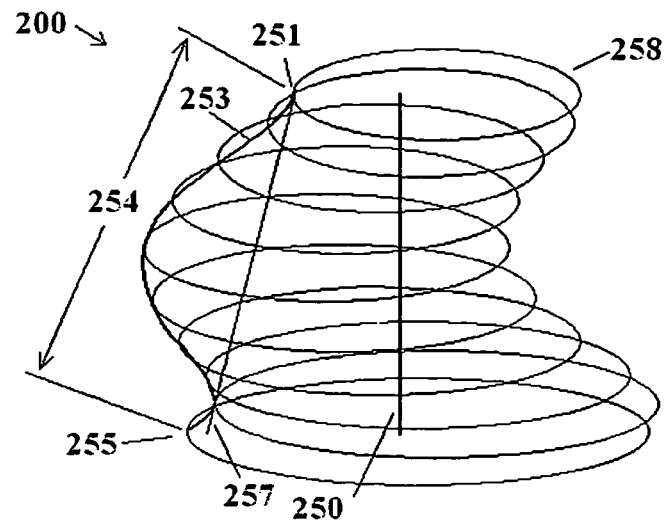
FIG. 9 is a diagrammatic view showing a portion of a profile wave of the surface wave threaded fastener of FIG. 6 represented as a stack of lateral waves.

FIG. 9 shows a stack of circular lateral waves 232 that forms a profile wave 253 with a period 254 from the top position 255 to bottom position 251. The bottom lateral wave 252 like all of the lateral axial waves is a circle. It is noted that FIG. 9 shows only a small portion of the threaded fastener 200 and that the portions of the circles to the right of line 250 are for illustrative purposes and do not represent the profile of the threads opposite the profile wave 253.

The significance of the single lead axial wave is that it is the simplest to machine since the shape to cut out is circular. Though the surface is circular, cutting it out would be an oval path because between cutting the root and crest, there are areas under and over the cutting tool width that would cut more out then the profile. A specialized tool with the oval tool path inside a jig to control the change in diameter and phase change of the tool path could be made as a hand held device to making wave threads in stone, wood or concrete.

Another property of the wave threaded fastener is that the wave thread can change its period and amplitude. This is demonstrated in FIG. 10, which shows a fastener 270 having wave thread 279 a profile wave 272 with a constantly increasing amplitudes 273 and constantly increasing periods 274 from the bottom end 278 to the top end 277.

Figure 10:
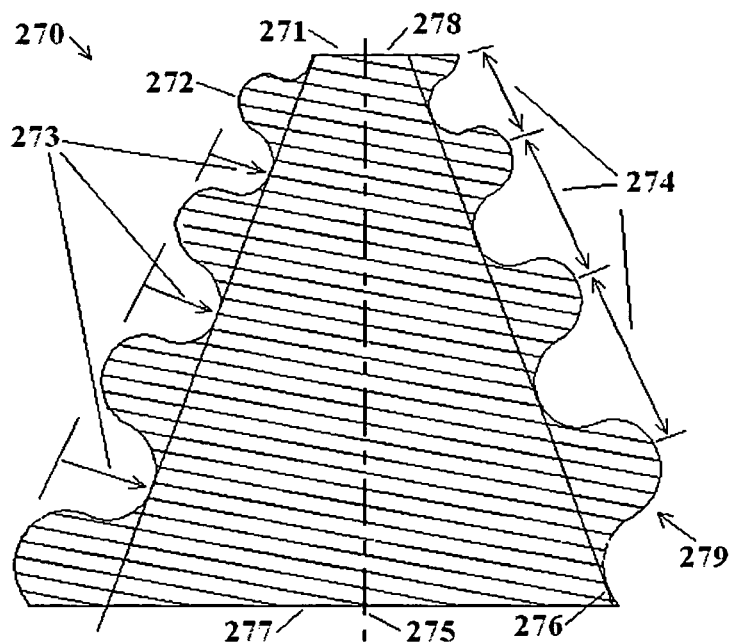
FIG. 10 is a cross sectional view of a wave threaded fastener with a wave that is increasing it period and amplitude.
Figure 11:
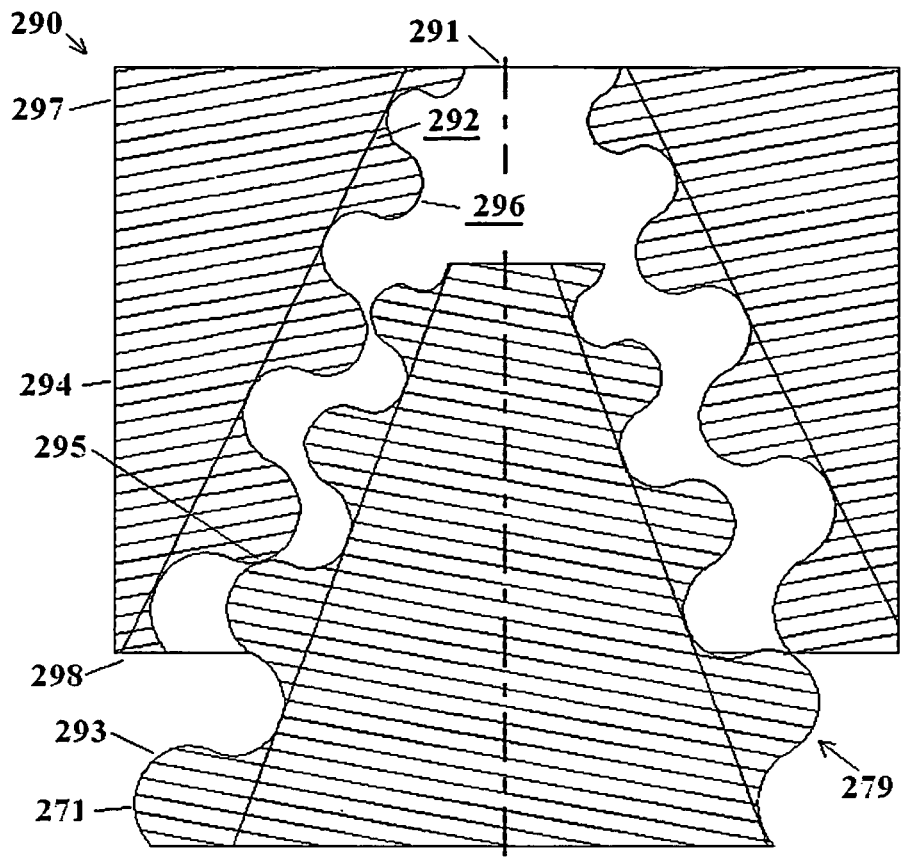
FIG. 11 is a cross sectional view of a wave threaded fastener of FIG. 10 being inserted into a workpiece with a receiving internal wave thread with an increasing period and amplitude.

FIG. 11 shows an embodiment of the fastening system 290 in which the fastener 271 of FIG. 10 is inserted into a workpiece 297 having a receiving internal wave thread 294. The fastener 271 is inserted until to makes contact at initial contact point 295 in workpiece 297. From this initial contact point 295, the outer wave thread 279 of the fastener 271 follows the inner wave thread 296 of the workpiece 297 as the two are screwed together. This results in completed surface matching as long as there is local clearance, meaning that every root and crest has clearance while they are passing through to their surface contact area. This means that until the threads are in their final position, they are essentially loose.

As noted above, although FIGS. 1-10 show fasteners having bodies with conic outer surfaces, the outer surface of the body of a wave threaded fastener does not need to be conic and wave threads may be applied to fasteners having concave bodies, convex bodies, or bodies having combinations of concave, convex and/or conic outer surfaces.

Figure 12:
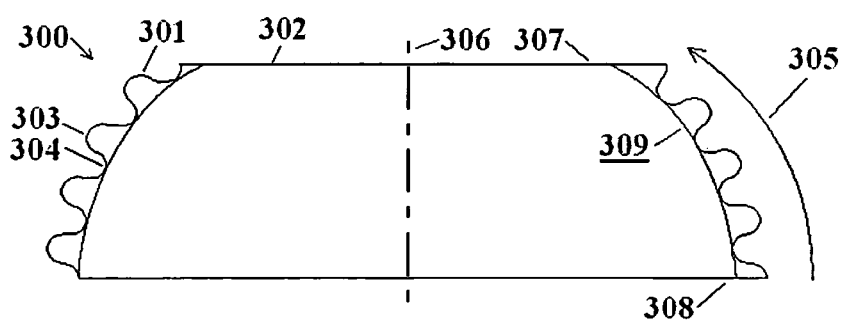
FIG. 12 is a diagramed view of a wave threaded fastener having a body with a concave outer surface.

FIG. 12 shows a fastener 300 having a body 302 with a concave outer surface 309. For purposes of consistency, "concave" is intended to refer to outer surfaces the bow outward away from the central axis from the top end 308 to the bottom end 307, while "convex" is intended to refer to outer surfaces that bow inward toward the central axis. As is the case with all wave threaded fasteners, the fastener 300 has a profile wave 301 with typical crests 303 and roots 304. The concave outer surface 309 of body 302 follows curve 305, which is substantially circular. However, it should be recognized that curve 305 could be elliptical, parabolic or hyperbolic.

Figure 13:
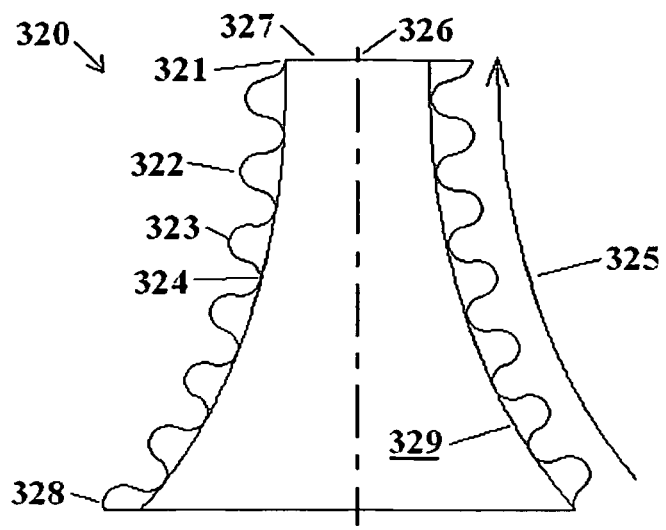
FIG. 13 is a diagram of a wave threaded fastener having a body with a convex outer surface.

FIG. 13 is a wave threaded fastener 320 having a convex shape. Fastener 320 has a profile wave 322 with typical crests 323 and 324 on a body 327 having an outer surface 329 with a convex shape that follows curve 325. The circular curve 325 of the outer surface 329 of body 327 could also be elliptical, parabolic or hyperbolic.

Figure 14:
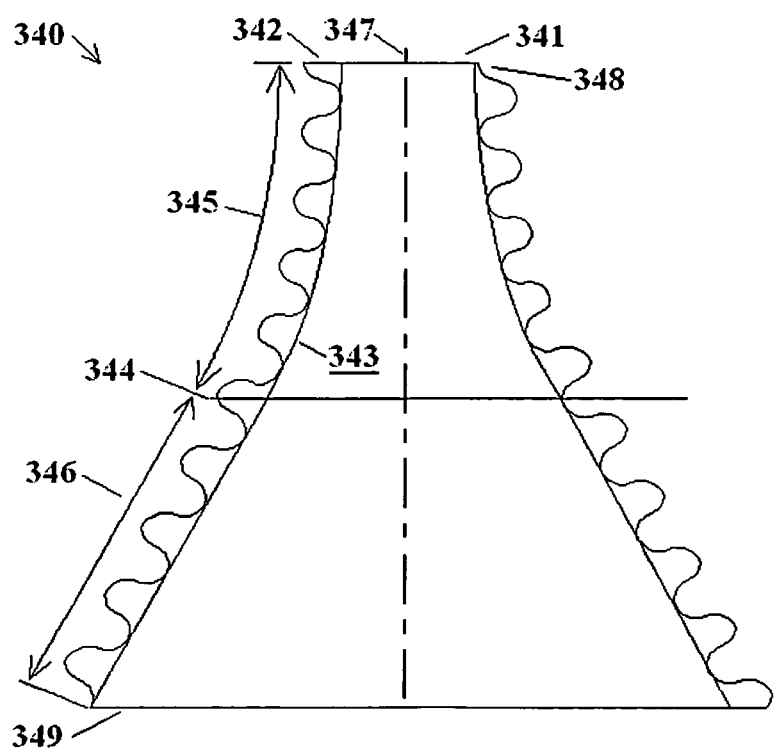
FIG. 14 is a diagram of a wave threaded fastener having a body with a convex surface combined with a cone surface.

FIG. 14 is threaded fastener having a body 341 with an outer surface 343 that is a combination of a conic and convex shapes 340. The concave portion 345 has been added to a cone portion 346 at dividing line 344. This combination 340 has a top 248, bottom 349 and central axis 347. It is noted that the combined threads of fastener 340 have to have the same rate of insertion per degrees of rotation rate. It has to have local clearance. The different shapes will pass through each other for the most part and be a loose connection until the surfaces fully engage. This looseness allows the local clearance of the teeth on different shapes to pass.

The fastening system of the present invention combines a wave threaded fastener with a workpiece, each of which are dimensioned to be fastened together. As noted above, the fastener and workpiece may take a number of forms depending upon the particular application for which the system is use.

Figure 15A:
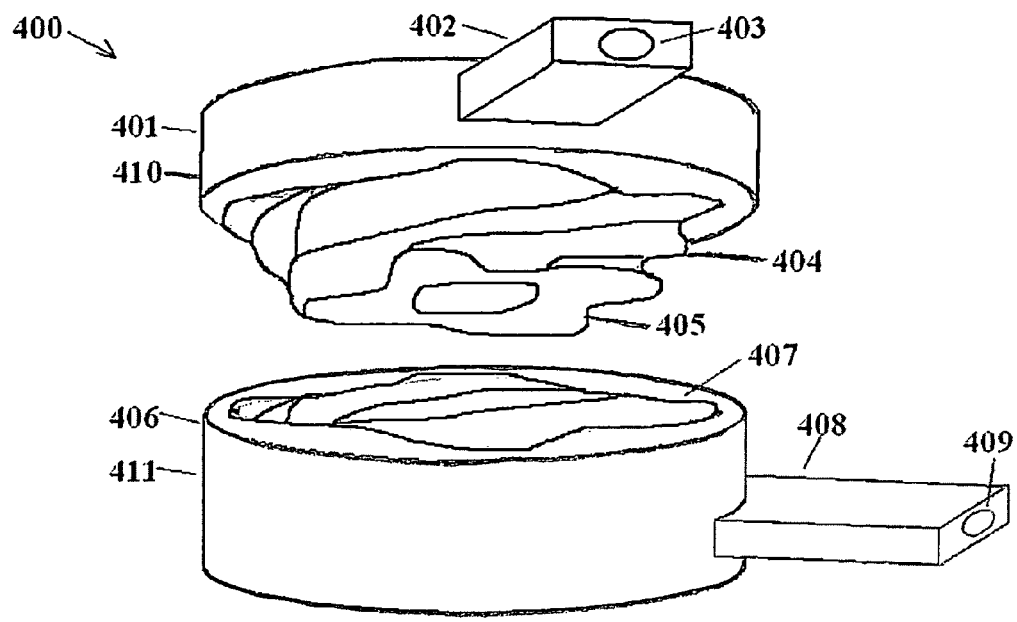
FIG. 15A-C are three diagrams showing the insertion of a wave thread system that connects a fluid, optical or electrical conduits.
Figure 15B:
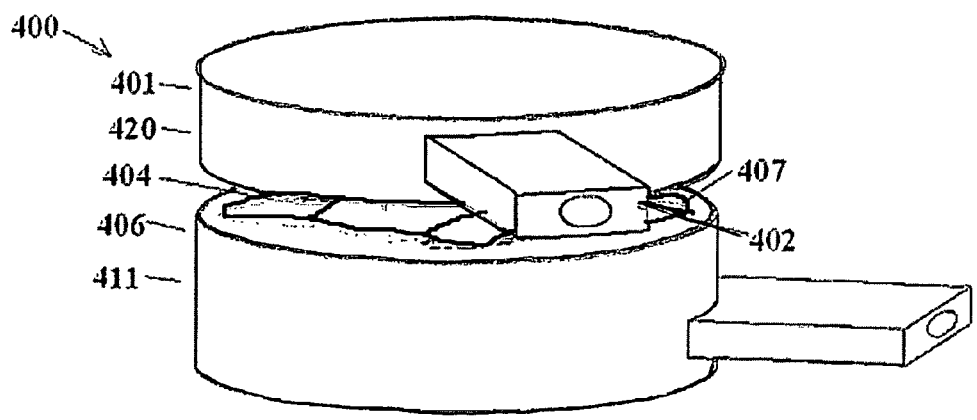

FIGS. 15A-C shows the application of the threaded fastening system of the present invention to the insertion and full engagement of two components 401, 406 of a connection system 400. The top insertion component 401 has a handle 402 that contains a conduit 403 and an external thread 404 that has the other end of the conduit 405 at its bottom. The bottom receiving component 406 has an internal thread 407, a handle 408 with a conduit 409. The receiving end of the conduit 409 inside the internal thread is not shown. The position 410 of the insertion component 401 is above the position 411 of the receiving component 406.

In FIG. 15B, the top insertion component 401 has moved 420 into the receiving component 406 at position 411. This downward insertion was made until the external teeth 404 of the top component 401 touched (not shown) the internal teeth 407 of the bottom component 406.

In FIG. 15C the top insertion component 401 has been screwed in or rotated 425 clockwise while inserting 424 downward to position 422. The bottom-receiving component 406 remained stationary at position 411. Not shown are the two conduits abutting inside. The external 404 and internal threads 407 engage to create a seal and to precisely position the conduit contacts. This application is a quarter turn to complete the connection. The conduit can be electrical, fiber optic, fluid or gas.

Figure 16:
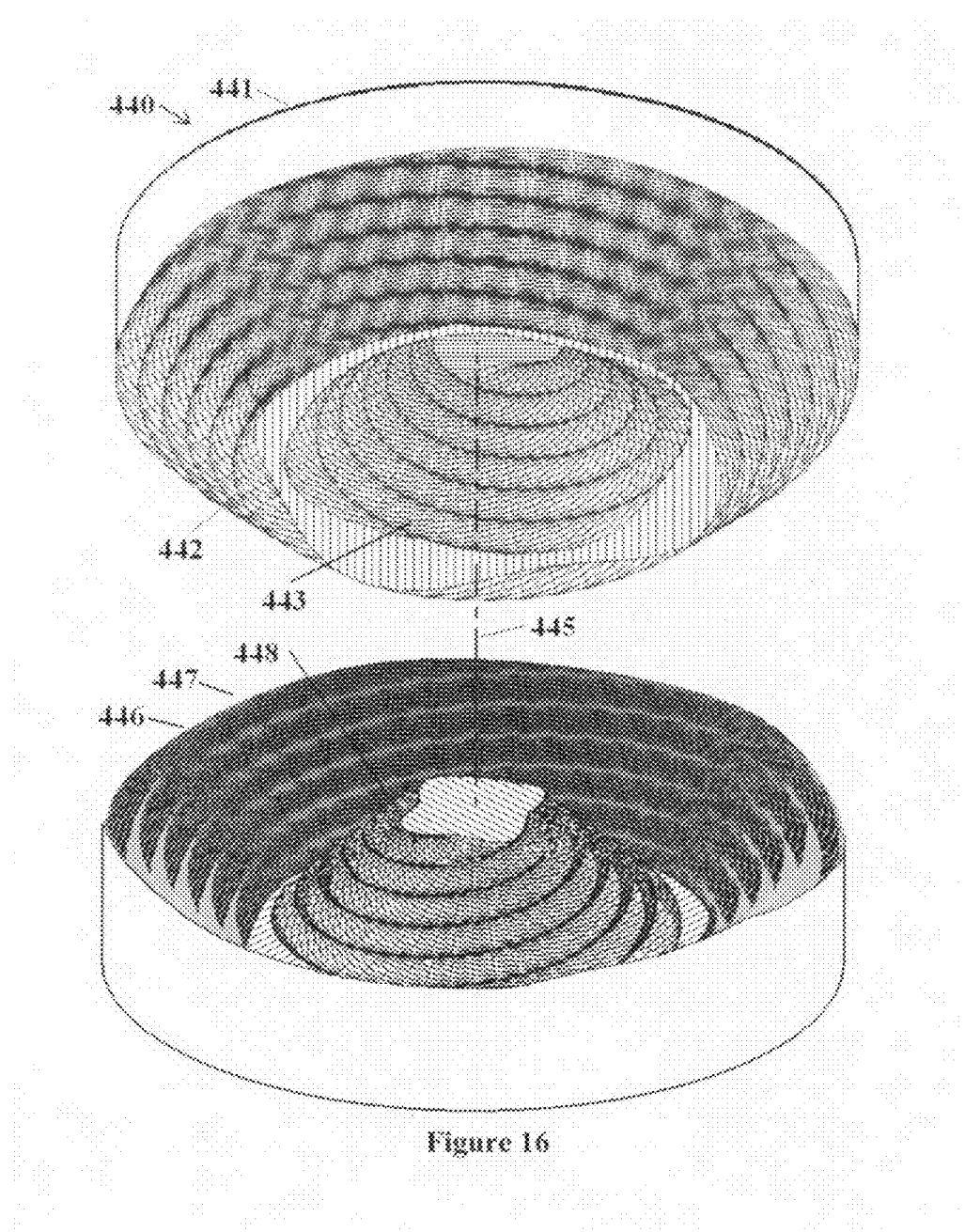
FIG. 16 is an isometric view of one embodiment of a system in which two wave threads are formed into both the fastener and workpiece.
Figure 17:
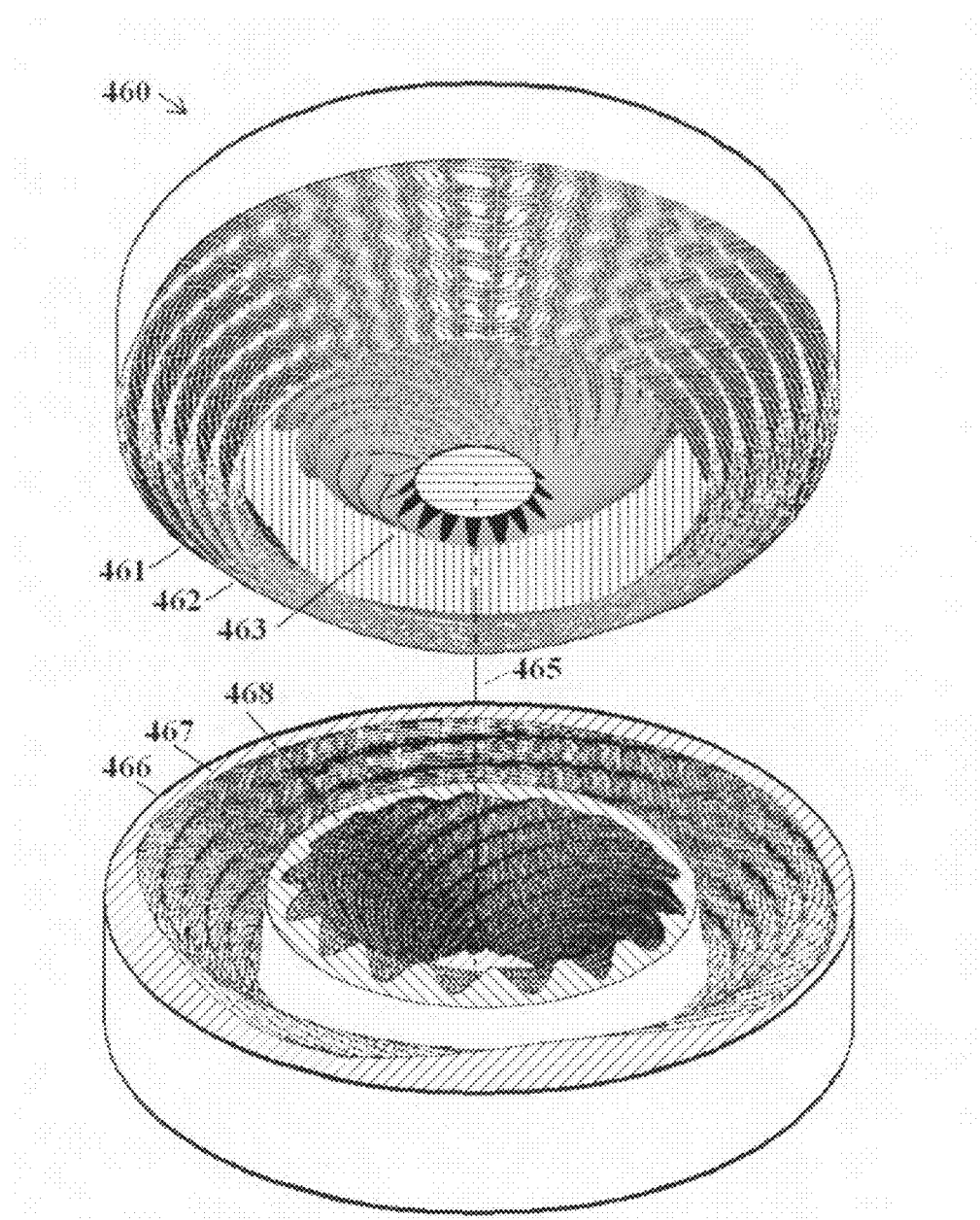
FIG. 17 is an isometric view of another embodiment of a system in which two wave threads are formed into both the fastener and workpiece.

FIGS. 16 and 17 each show different embodiments of combination thread systems 440, 460. Looking first to FIG. 16, top component 441 of system 440 has an outer external wave thread 442 and an inner internal wave thread 443. This component 441 is referred to as the "male component" because it has an outer external wave thread. The mating bottom component 446 has an outer internal wave thread 447 and an inner external wave thread 448, and will be referred to as the "female component". Both components 441, 446 have a common axis 445 and all the threads are concentric to this common axis 445. Both the inner wave threads 443, 448 and the outer wave threads 442, 447 are concentric to their axis 445 and have the same insertion rate per degrees of rotation. These two properties allow mating of the top 441 and bottom 446 components as a single unit.

The system 460 of FIG. 17 differs from the system 440 of FIG. 16 in orientation of the constituents thread systems. The top component 461 has an outer external thread 462 and an inner external thread 463. The bottom component 466 has an outer internal wave thread 467 and an inner internal wave thread 468. Both are concentric to a common axis 464, 465. Both wave thread systems have the same insertion rate per degrees of rotation allowing the two systems to act as one. The difference is a function of connection leverage and physical strength of the two applications. The inner wave thread systems 443, 447 provide more physical material for a shallow thread to hold on to. This strengthens the entire system 440, 470.

Figure 15:
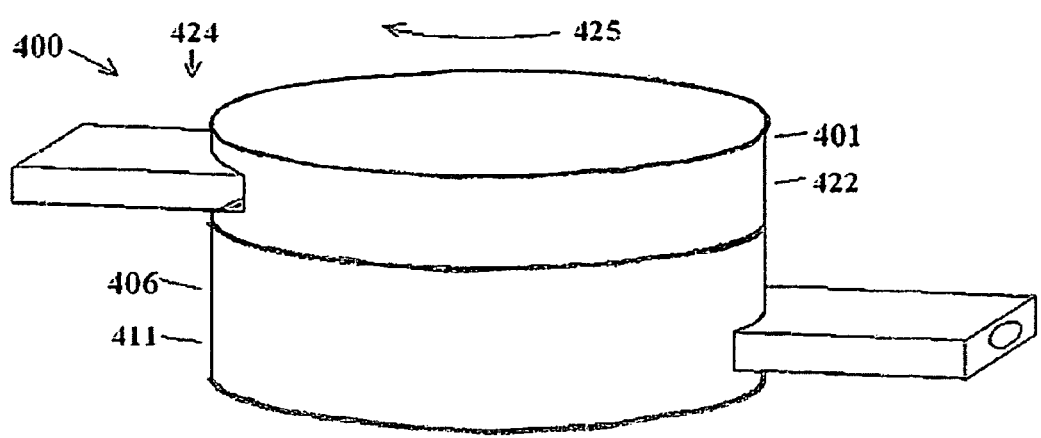

FIGS. 15, 16 and 17 merely demonstrate some of the possible ways of combining wave thread systems into a larger systems. Their common properties are concentric to the central axis, same rate of insertion per degree of rotation, local clearance and precision contact points on all threads. The precision contact points allow the development of larger scale conduit systems disclosed in FIGS. 15A-C in the order of hundred or thousands of discrete contacts.

Figure 18:
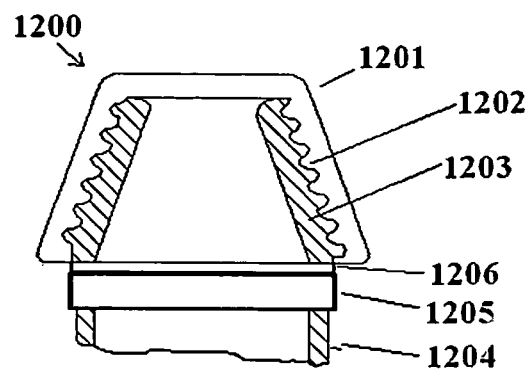
FIG. 18 is a cross sectional view of the fastening system in which the fastener is a beverage container and the workpiece is a bottle top.

Referring to FIG. 18, one of the applications for wave threads is on a beverage bottle and cap assembly 1200. The bottle 1204 has a cap 1201 with internal wave thread 1202 that can twist off against the bottle's external wave thread 1203. In the process of twisting off, the shear band 1206 breaks and the tamper proof ring 1205 is separated. The thin wall of the shearing band 1206 is broken across its entire circumference at once, which frees the tamper proof ring. The loose ring is evident of the broken seal.

Conventional bottles break their seal in 60-120 degrees of rotation. Some seals are maintained with a plug that goes down into the bottle. The bottle and cap assembly 1200 having a conic wave thread 1202 breaks its seal in a much shorter rotation. One application is with a concave shape and elongated threads. These threads become flatter at the top. This lends itself to the vacuum suction on the top, which will maintain the seal with more degrees of rotation. The elasticity of the material will determine the amount of give the top will have at holding the seal. A tight, brittle shrink-wrap is another example of current art that would demonstrate tampering or seal compromise.

Figure 19:
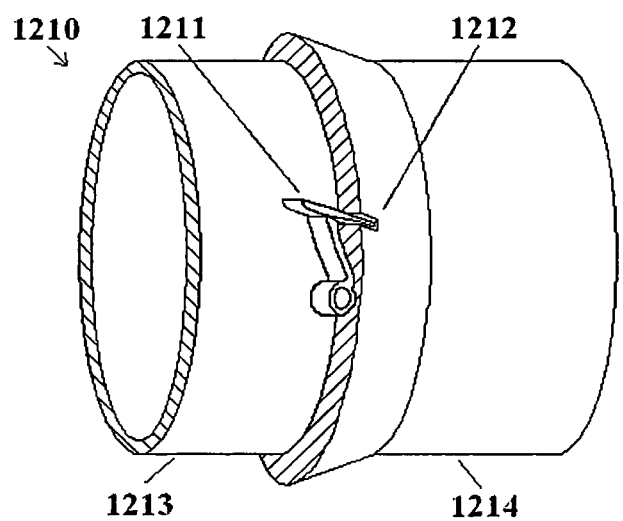
FIG. 19 is an isometric view of one embodiment of the fastening system in which a spring clip is used to prevent unwanted rotation of the fastener and workpiece.

When a wave thread is rotated until its surfaces are brought together they maximize their coefficient of friction with high surface contact, which is resistant to counter-rotation. Other applications require even greater security or proof of seal. A simple spring clip 1211 demonstrated 1210 in FIG. 19 that locks into a slot 1212 holds the internal piece 1213 inside the external piece 1214 together. This is an example of using devices that are current art that lock the fastener system 1210 together against unplanned counter-rotation. There are many different types of clips or securing mechanism in the current art that can accomplish this.

Figure 20A:
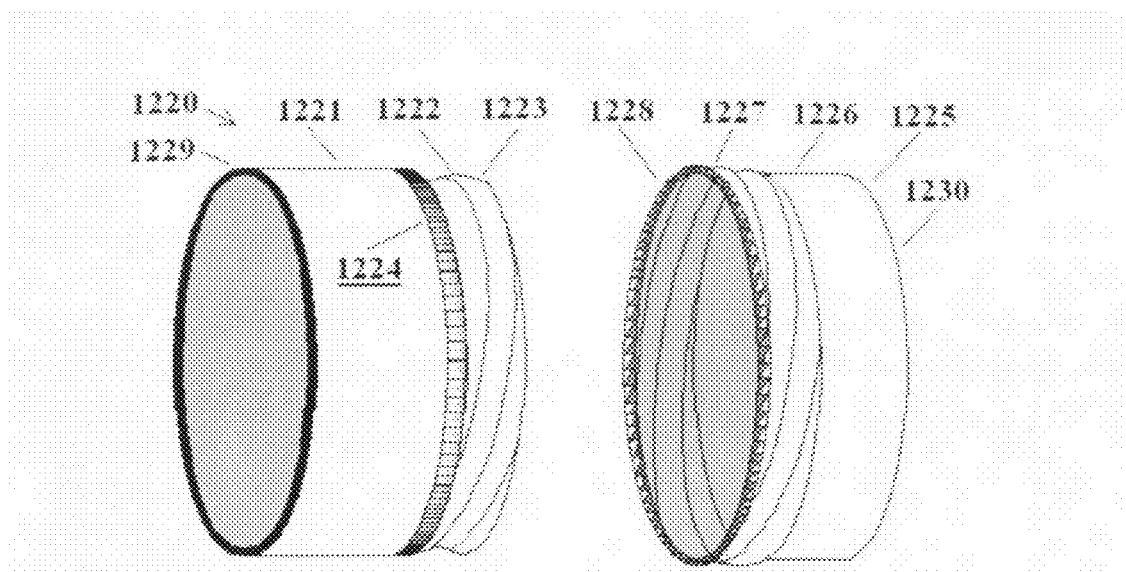
FIG. 20A-B are isometric view of an embodiment of the fastening system in which serrated teeth are formed into the workpiece and fastener and are used to prevent unwanted rotation of the fastener and workpiece.
Figure 20B:
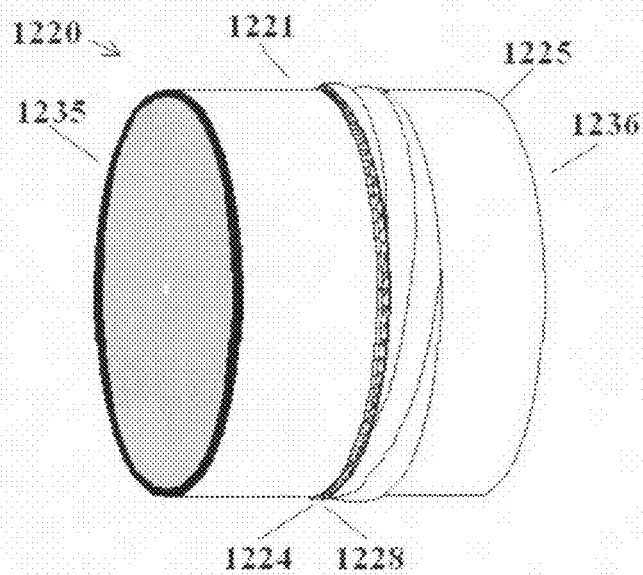

FIG. 20A shows a pair 1220 of plastic pipe ends 1221, 1225 to be joined. One end 1221 at position 1229 has an external wave thread 1222 molded into the male end 1223 and a thin band of serrated teeth 1224. The other pipe end 1225 at position 1230 has internal teeth 1227 molded into the female end 1226 also with a band of serrated teeth 1228. When the two pipe ends 1221, 1225 are screwed together in positions 1235, 1236 as shown in FIG. 20B, the serrated teeth 1224, 1228 are ratcheted in place. The angle of the teeth 1224, 1228 and the flexibility of the plastic determine the ratcheting force and the disconnecting force. These teeth do not have to sustain the force of the connection, just resist being unscrewed. This can be overcome to unscrew the pipes 1221, 1225 as well. The dynamics of the ratcheting teeth are a function of their angle, width, flexibility and thickness. This is a less expensive more passive securing strategy. The plastic pipe can have all these shapes rolled and molded using current processes.

Figure 21:
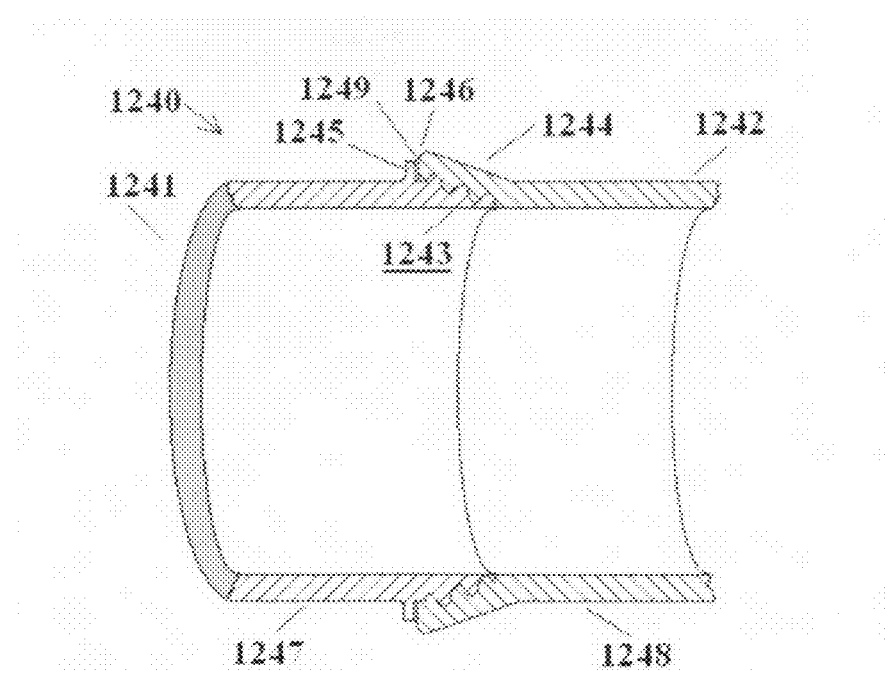
FIG. 21 is an isometric view of one embodiment of the fastening system in which a glue joint is used to prevent unwanted rotation of the fastener and workpiece.

FIG. 21 shows a pipe assembly 1240 in which the male end 1247 of pipe 1241 joined with the female end 1248 of pipe 1242 by way of the external wave thread 1243 fully engaged with the internal wave thread 1244. Between them are a raised surface 1245 near the beginning of the external wave thread 1243 and a corresponding surface 1246 near the end of the internal wave thread 1244. These raised surfaces 1245, 1246 are designed to be glued 1249 together creating an inexpensive means of securing the pipe from unscrewing.

Figure 22:
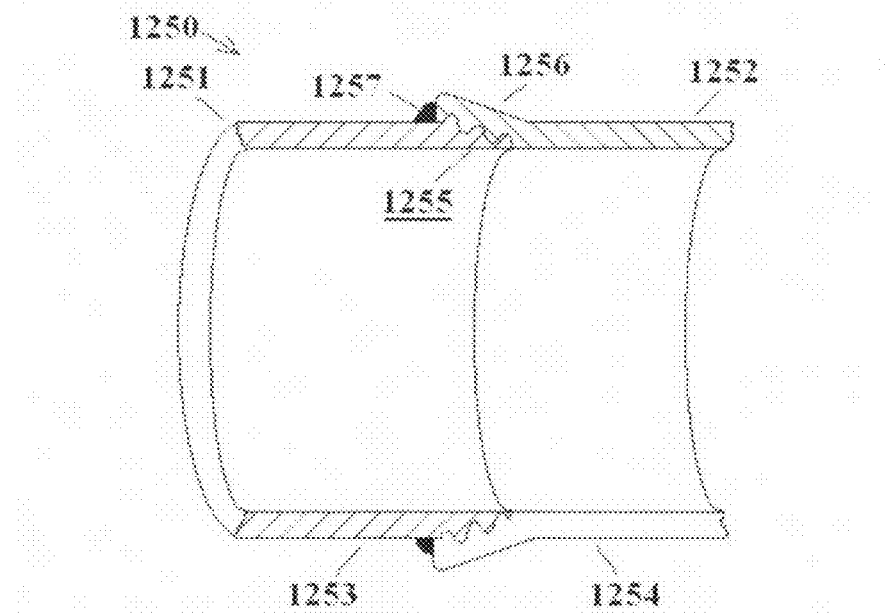
FIG. 22 is an isometric view of one embodiment of the fastening system in which a weld joint is used to prevent unwanted rotation of the fastener and workpiece.

Steel pipes are often be welded together. FIG. 22 shows a pipe assembly 1250 having wave threads that is welded. The male end 1253 of pipe 1251 has the external thread 1255 engaged with the internal thread 1256 on the female end 1254 of pipe 1252. In addition, these pipes 1251, 1252 have a weld bead 1257 where the threads 1255, 1256 engage. This bead can be spot-welded or a continuous weld. Its advantage is it does not need as much welding because of the security of the wave threads 1255, 1256. This would incorporate the wave threads for making a precise alignment of the pipe and a guaranteed seal. The wave thread will make the primary seal and the welding a secondary seal. The forming and machining of the pipes could include tabs (not shown) that a hydraulic pipe jointer would lock on to too rotate the pipe. This device is attached to both ends and it draws them together and rotates them to be precisely screwed together. The smaller welds and inherent alignment would translate into less time attaching the pipes and lower production cost. Removing these pipes will require grinding off the welded portion and rotating the pipes. This application is for physically challenging environments such as submarines and navel ships; space ships; gas and oil piping; or anything that needs to be able to withstand explosions, tremendous changes in pressure and have long term duration.

Figure 23A:
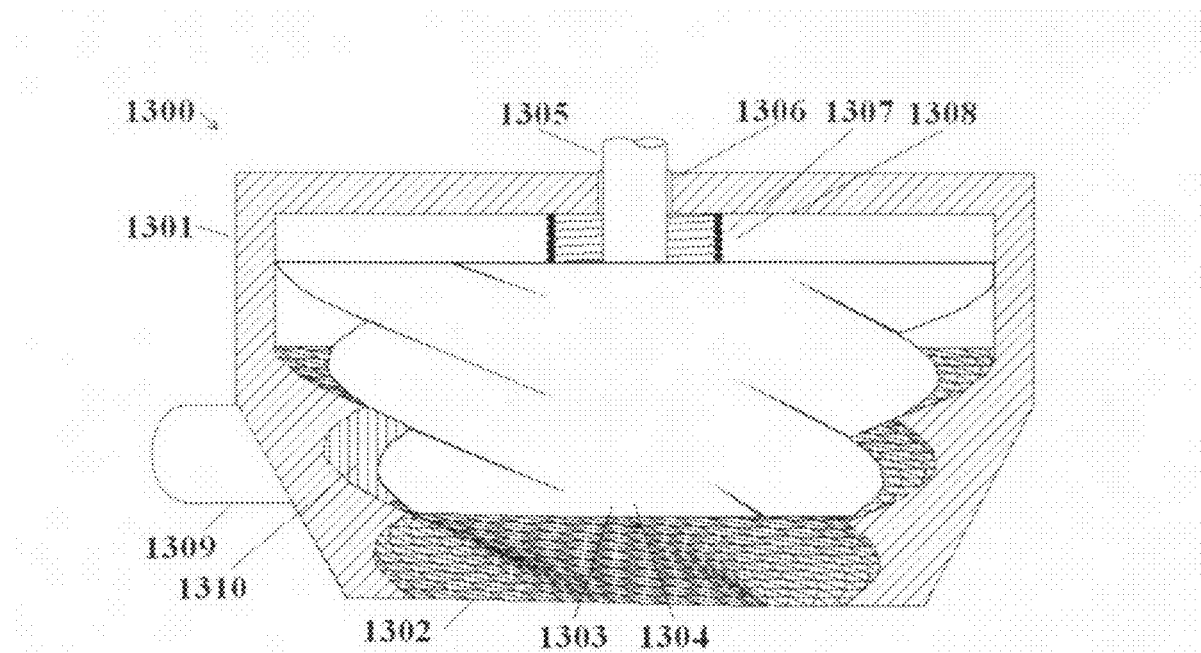
FIG. 23 A-B are cross sectional views of a on embodiment of the fastening system adapted for use a valve.
Figure 23B:
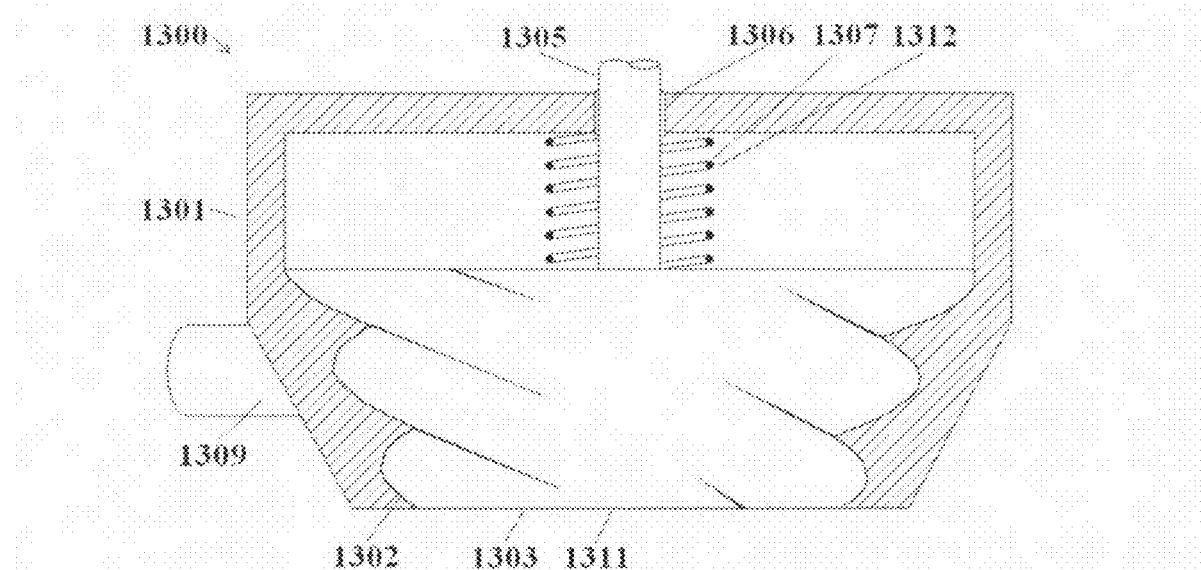

The wave thread can be used in a valve system 1300 because its surfaces fully engage, the threads "seat" themselves and act as a flow control mechanism. FIGS. 23A and 23B are an example of a wave thread valve system 1300 with in the open and closed positions. In FIG. 23A there is a valve body 1301 that contains a wave thread seat 1302 and a wave plunger 1303 in the open position 1304. The plunger 1303 has a control stem 1305 that goes through a seal 1306. It is held in position with a spring 1307. With the valve open 1304 the spring 1307 is compressed 1038 and the intake 1309 port 1310 is open.

FIG. 23B is the wave thread valve system 1300 with the plunger 1303 screwed down 1311 to a closed position against the wave thread seat 1302. The spring 1307 is in a relaxed position 1312. The wave threads seat 1302 and plunger 1303 act as the screwing and unscrewing mechanism with the plunger thread 1303 pushing against the seat thread 1302. The spring 1307 maintains the downward pressure against the corresponding threads to keep the plunger 1303 from floating. The rotation of the control stem 1305 turns the plunger 1303 to open and close the valve system 1300.

Both the perpendicular profile of the conic thread and wave thread concepts can be applied to grinders, turbines, propellers, impellers and drills. Grinding uses the geometry of the thread to pull material down into a smaller volume while the hardened thread exerts a squeezing force. A cone, convex or concave wave geometry and changing period and amplitude geometry that change its volume can be applied as in a compressor for a turbine or in an impeller design that accelerates fluid jets.

Although the present invention has been described in considerable detail with reference to certain preferred versions thereof, other versions would be readily apparent to those of ordinary skill in the art. Therefore, the spirit and scope of the invention should not be limited to the description of the preferred versions contained herein.

What is claimed is:

1. A wave threaded fastening system comprising:
   a wave threaded fastener comprising:
      a body comprising a central axis, an outer surface, a top end, and a bottom end, wherein said outer surface of said body forms a circumference about said central axis and wherein said circumference of said outer surface progressively decreases from said top end to said bottom end; and
      an outer wave thread extending from said outer surface of said body, said outer wave thread comprising a profile wave and a lateral wave;
      wherein said profile wave is a continuous wave extending from said top end of said body to said bottom end of said body, wherein said profile wave comprises a plurality of profile crests and profile roots defining a plurality of profile thread widths, and wherein a line intersecting each of said plurality of roots defines said outer surface of said body;
      wherein said lateral wave comprises at least one lateral crest and at least one lateral root defining at least one wave period, wherein each of said at least one wave period forms a period arc about said central axis of said body, wherein each period arc has a period arc angle, and wherein a sum of all period arc angles about said lateral wave equals three hundred and sixty degrees; and
      wherein each of said plurality of profile crests is substantially aligned with a corresponding lateral crest and each of said profile roots is substantially aligned with a corresponding lateral root such that said wave thread travels one period thread width per period arc traveled; and
   a workpiece comprising at least one inner surface, wherein said at least one inner surface comprises at least one inner wave thread dimensioned to engage with said outer wave thread of said wave threaded fastener.

2. The wave threaded fastening system of claim 1 wherein said outer wave thread and said inner wave thread are dimensioned such that at least fifty percent of a surface of said outer wave thread is in contact with a surface of said inner wave thread when said outer wave thread is fully engaged with said inner wave thread.

3. The wave threaded fastening system of claim 2 wherein said wave threaded fastener comprises a cover, wherein said workpiece comprises a container, and wherein engagement of said cover and said container results in a substantially fluid tight seal.

4. The wave threaded fastening system of claim 1 further comprising locking means for preventing unwanted rotation of said threaded fastener relative to said workpiece.

5. The wave threaded fastening system of claim 4 wherein said locking means is selected from a group consisting of a breakaway ring, a spring clip, a set of ratcheting teeth, a welded joint, and an adhesive joint.

6. The wave threaded fastening system of claim 1 wherein said one of wave threaded fastener and said workpiece is a valve body comprising a wave thread seat, and another of wave threaded fastener and said workpiece is a wave plunger.

7. The wave threaded fastening system of claim 1 wherein said wave threaded fastener comprises a male portion of a connector, said workpiece comprises a female portion of said connector and wherein each of said male portion of said connector and said female portion of said connector are dimensioned such that full engagement of said outer wave thread and said inner wave thread results in a connection being made.

8. The wave threaded fastening system of claim 7 wherein said connector is selected from a group consisting of an electrical connector, a fiber optic connector, and a fluid connector.

9. The wave threaded fastening system of claim 1 wherein at least one of said outer wave thread and said inner wave thread is manufactured from more than one material.

10. The wave threaded fastening system of claim 1 wherein each of said wave threaded fastener and said workpiece comprises at least two wave threads; wherein each of said wave threads of said wave threaded fastener and said workpiece are concentric; and wherein each of said wave threads of said wave threaded fastener engage with said corresponding wave threads of said workpiece at an equal rate of insertion per rotation.

\* \* \* \* \*